Nov. 1, 1960 L. W. DEAMER ET AL 2,958,351
ASSEMBLY JIG FOR SKIDS
Filed Dec. 5, 1958 3 Sheets-Sheet 2
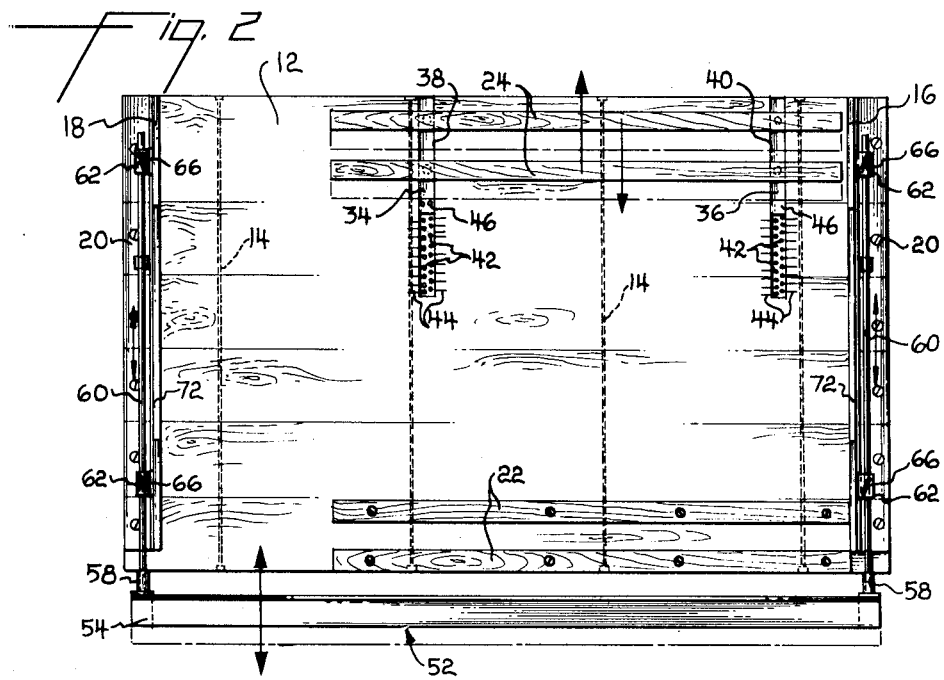
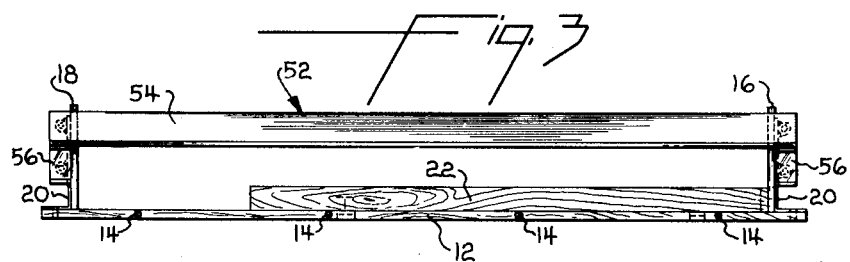
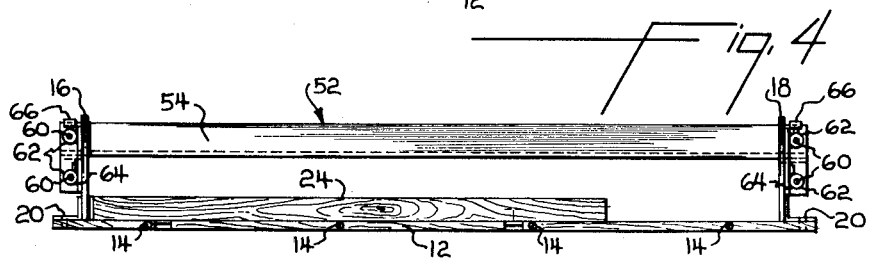
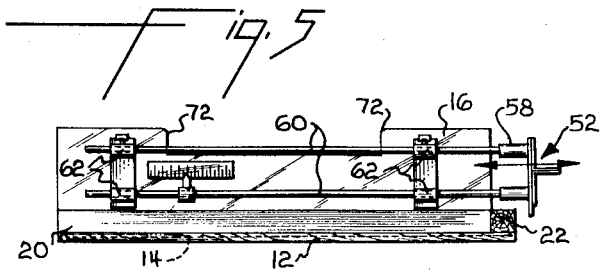
INVENTORS
Lloyd W. Deamer and
John F. Sweers
BY
ATTORNEY

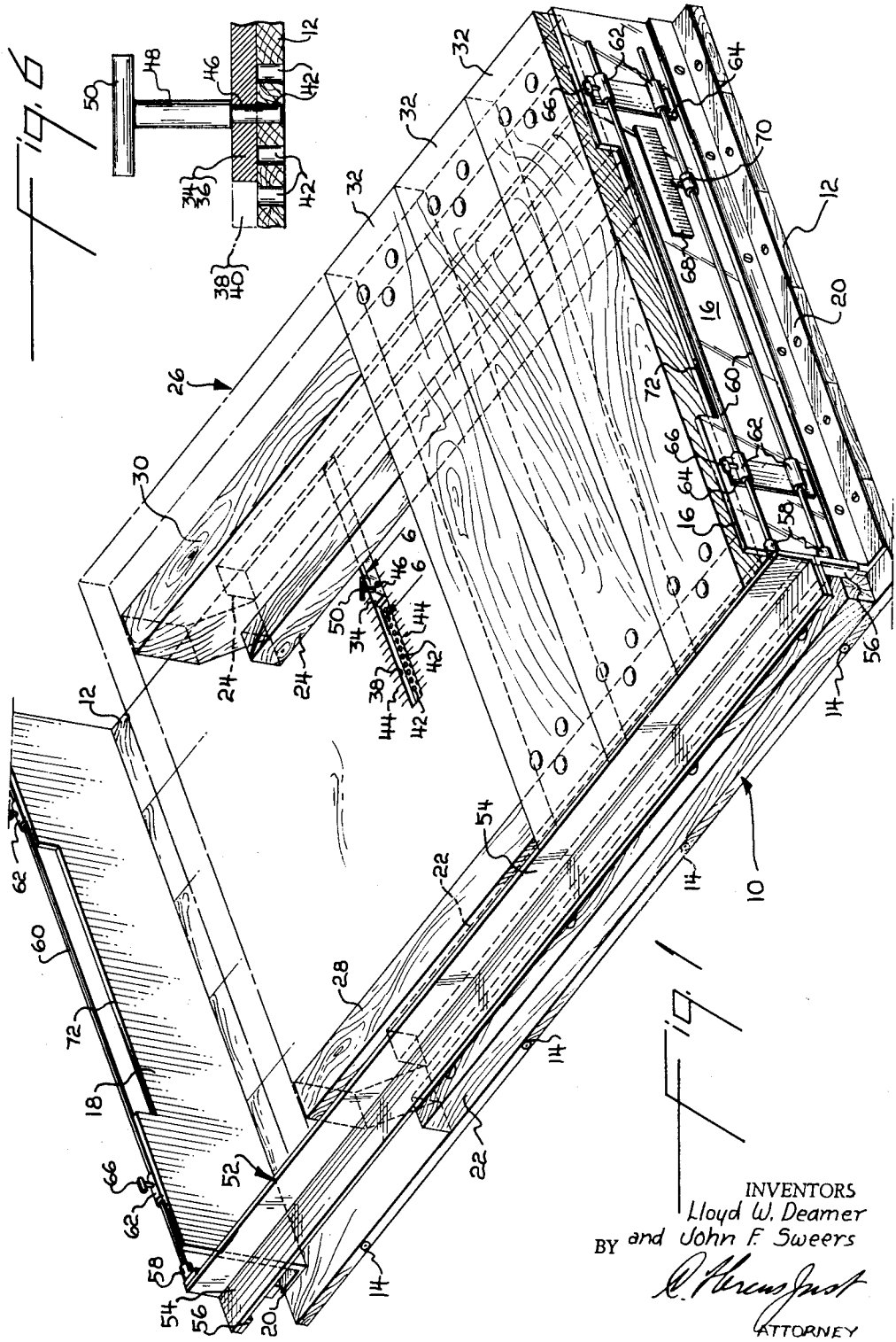

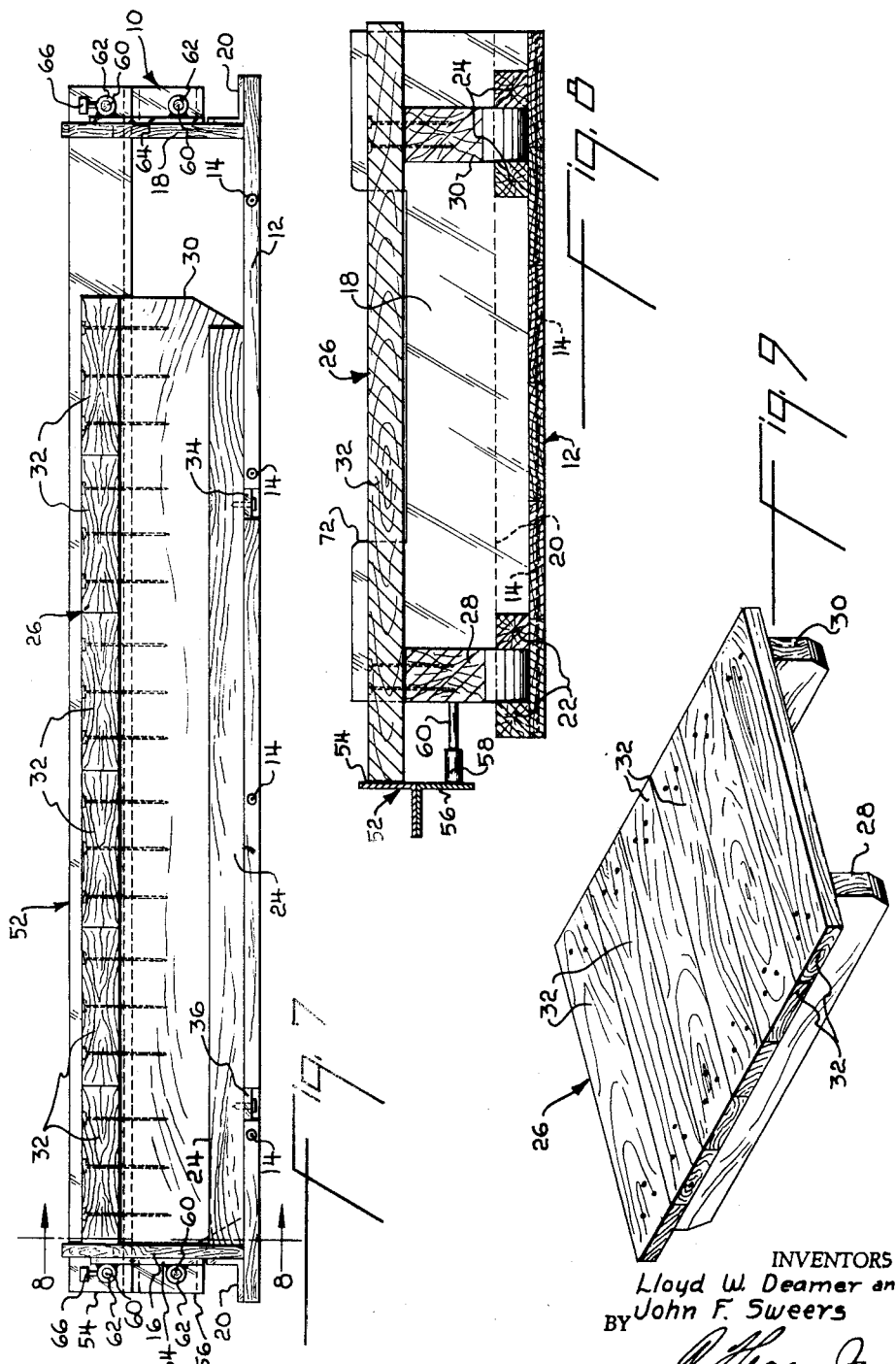

United States Patent Office 2,958,351
Patented Nov. 1, 1960

2,958,351

ASSEMBLY JIG FOR SKIDS

Lloyd W. Deamer and John F. Sweers, Hanover, Pa., assignors to P. H. Glatfelter Company, Spring Grove, Pa., a corporation of Pennsylvania Filed Dec. 5, 1958, Ser. No. 778,438

3 Claims. (Cl. 144—288)

This invention relates to an assembly jig for making skids and, more particularly, to skids comprising at least one pair of elongated runners across which deck means such as boards of similar length are placed and secured to the runners.

Skids of the type referred to are used widely in industry for various purposes, particularly to facilitate the handling of material by lift trucks, whereby the forks of the lift trucks readily may be disposed beneath the skid to raise and move the skid and any objects or material carried thereby. In certain industries such as those manufacturing heavy machinery or other heavy products such as stacks of paper, it is conventional to ship such products mounted upon a skid to facilitate the handling thereof and also to protect the product. Under such circumstances, although a certain number of such skids are recovered after shipment of products and are returned to the manufacturer, the manufacturing of such skids in substantial quantities is a necessary operation incident to the sale of products of such companies.

For many years, the manufacturing of skids has been accomplished by sawing the necessary components of the skids either by hand or power saws, placing the runners upon a suitable work surface, holding them parallel to each other by improvised means or fixed jigs of one kind or another, placing the deck boards or platform upon the upper surfaces of the runners, and then nailing or otherwise securing the deck means to the runners. A considerable amount of man power has been required to accomplish this and the cost of such production has progressively been higher in recent years. Efforts to decrease the cost of manufacturing of such skids have been made by manufacturers utilizing fixed jigs of a single size or a limited number of sizes in order that the various components of the skids to be manufactured might be assembled with a minimum requirement of time and the components held in place while nailing of the deck means upon the runners took place, either by hand or power nailing machines. If a manufacturer is utilizing a number of skids of the same size or of only a limited number of different sizes, the use of fixed jigs is feasible. However, where a manufacturer requires a relatively wide range of different sizes of skids, then the maintaining of an inventory of jigs of suitable sizes becomes quite expensive and also introduces a storage problem. Jigs of this type frequently are quite large and heavy, whereby the moving of the same to and from storage during use presents added difficulties.

It is the object of the present invention to provide an adjustable jig for making skids of a wide variety of sizes including not only the length and width of the deck of the skid but also in the amount of overhang of the deck relative to the outer side surfaces of the runners, and also in the height of the runners, such adjustable jig having a minimum number of adjustable elements commensurate with the requirements of the jig, whereby such single jig quickly may be adjusted to assemble a run of skids of identical size, as well as being further adjusted to assemble incidental or short runs of skids of different sizes.

Another object of the invention is to provide such adjustable jigs with components which are rugged and durable so as to be capable of long life notwithstanding the fact that heavy components of the skids are mounted in and upon the jig, and the various adjustable elements readily and quickly are secured in adjusted position by manually operated locking means.

A further object of the invention is to provide particularly the adjustable components of the jig with substantial dimensions which will render the jig adequate to assemble skids utilizing a substantial range of thicknesses and other sizes of component parts.

Still another object of the invention is to provide suitable indicating gauge means which facilitate the movement of the adjustable members of the jig quickly and accurately to desired position without requiring the use of auxiliary measuring means such as tape measures, yard sticks, and the like.

Details of the foregoing objects and of the invention, as well as other objects thereof, are set forth in the following specification and illustrated in the accompanying drawings comprising a part thereof.

In the drawings:

Fig. 1 is a perspective view of an exemplary assembly jig embodying the principles of the invention and also showing disposed thereon a partially assembled skid.

Fig. 2 is a top plan view of the assembly jig shown in Fig. 1 but illustrated on a smaller scale than that used in Fig. 1.

Fig. 3 is a vertical end elevation of the jig shown in Fig. 2 as seen from the lower end thereof illustrated in Fig. 2.

Fig. 4 is a vertical elevation showing the opposite end of the jig shown in Fig. 2 as seen from the upper end thereof illustrated in said figure.

Fig. 5 is a side elevation of the jig shown in Fig. 2 as seen from the left-hand side of Fig. 2.

Fig. 6 is a fragmentary vertical elevation, partly in section, taken on the line 6—6 of Fig. 1 and employing a larger scale than in Fig. 1.

Fig. 7 is an enlarged vertical end elevation similar to that shown in Fig. 4 and showing an assembled skid positioned therein at the completion of assembly of the components of the skid in accordance with the principles of the invention.

Fig. 8 is a vertical sectional view taken on the line 8—8 of Fig. 7.

Fig. 9 is a perspective view of an exemplary skid of the type for which the assembly jig illustrated in the preceding figures is designed to construct.

It will be understood that in manufacturing skids of the type referred to and for which the present assembly jig is adapted to facilitate such manufacturing, that the runners for each skid are substantially identical and are pre-cut in the manufacturing plant so as to provide a supply thereof in the assembly department. Similarly, the deck means, which usually comprise boards of similar thickness, width, and length, also are pre-cut especially so as to be of the same length, and a supply of these is on hand in the assembly department. Supplies of such components are stacked in convenient locations to the assembly jig and, in a highly mechanized department, conveyors to and from a power-operated nailing machine can be employed to support the jig while the assembly of the skid components thereupon takes place, following which the jig with its assembled skid components thereon is moved by conveyor to the nailing machine, after which the completed skid is removed from the jig and the jig is returned by additional conveyor means to the assembly location. To further increase production, a number of assembly jigs can be employed so that, for example, while one skid upon a jig is being nailed, one or more skids can be assembled on additional jigs prior to being moved to the nailing machine.

It is to be understood that the assembly jig illustrated on the accompanying drawings primarily is exemplary to illustrate basic principles thereof. Such jig may be made from different types of materials and the material is not necessarily to be restricted to that described in detail hereinafter.

The assembly jig 10 comprises a base 12 which may be of any desired width and length, as well as of a required thickness. For convenience of handling, and particularly to minimize the weight, the base 12 preferably is made from wood of a durable nature such as maple and a plurality of boards may be secured together, using tie-rods 14 extending therethrough, if desired. Extending upward from the preferably planar upper surface of base 12, adjacent opposite side edges of the base, are a vertical headboard 16 and tail board 18. These may be formed either from metal plates or wooden boards of suitable thickness. The headboard 16 and tail board 18 respectively are secured to base 12 by any suitable means such as an elongated metallic angle member 20, suitable screws or bolts being employed to effect connection, as shown in Fig. 1. The headboard 16 and tail board 18 also are of substantial height and, for practical purposes, such height should be of the order of 9 or 10 inches, particularly for purposes of constructing heavy duty jigs utilizing, for example, runners which are 8 inches high. Further, the tail board and headboard preferably are substantially as long as the edges of the base 12 to which they are secured.

The base 12 also is provided with at least two channel means 22 and 24 which, for practical purposes, respectively may comprise a pair of elongated square wooden members of hard stock such as oak or maple, and of the order of 2 inches by 2 inches in cross-section. The channel means 22 are fixed to base 12 by screws or other suitable means, whereby said means comprises a fixed location from which certain other adjustable members of the jig are movable, including the channel means 24. The channel means 22 and 24 preferably are parallel to each other and also parallel to the opposite ends of the base 12 of the jig. Further, said channel means 22 and 24, at one end, preferably abut the headboard 16 and extend therefrom toward the tail board 18 but it is not necessary that they extend completely to tail board 18.

The elongated members respectively comprising channel means 22 and 24 are spaced apart a fixed distance substantially equal to that of the width of the runners of the skid which are intended to be assembled by said jig and provide unobstructed channel ways between the means 22 and 24. In heavy duty jigs for example, runners of approximately 2 inches or 3 inches in width customarily are used and it will be found that any individual manufacturer usually standardizes upon a single width of runners for such jigs. Hence, a fixed space between the respective pairs of elongated members comprising the channel means 22 and 24 is utilized. The space between the respective members of the channel means is slightly greater than the width of the skid runners in order that the skids readily may be placed within the channel means and supported thereby substantially in vertical position without being wedged therein.

Referring to Fig. 8 in particular, an exemplary skid 26 is shown therein with the runners 28 and 30 positioned within channel means 22 and 24 respectively. As stated hereinabove, the runners 28 and 30 are cut to similar size prior to assembly of the skid and the deck means of the skid, in the exemplary illustration shown herein, comprises a plurality of planks, such as 2 x 6's 32 which are cut to even length beforehand to provide a supply thereof. In some skids, it is preferred that the ends of the deck boards 32 be flush with the exterior vertical sides of runners 28 and 30, while in other skids it is preferred that the ends of the deck boards overhang the runners preferably even distances at opposite edges of the skid. The latter type of skid is illustrated in Figs. 8 and 9.

To set the assembly jig for the assembly and fabrication of a skid in which the space between the runners 28 and 30 is to be a predetermined dimension, the jig initially is adjusted by moving channel means 24 relative to channel means 22 in a direction transverse to the channel means. To accomplish this, the pair of elongated members comprising channel means 24 are secured to a pair of transverse adjusting bars 34 and 36 which are slidably disposed within complementary elongated recesses 38 and 40 formed in the base 12. The recesses 38 and 40 also are provided with a plurality of evenly spaced positioning holes 42, details of which are shown in Fig. 6, and adjacent at least one side of each of the recesses 38 and 40 are scales 44 including suitable indicia. The individual holes in each of the respective rows 42 thereof are evenly spaced in the individual rows but said rows are staggered relative to each other to provide reasonably short increments such as of the order of ¼ inch.

The adjusting bars 34 and 36 also are provided with one or more holes 46 which receive the lower end of positioning pins 48 which preferably have handles 50 secured to the upper end thereof, as shown in Fig. 6. The indicia of the scales 44 relative to the recesses 38 and 40 are duplicates of each other and respectively are similarly spaced from the channel means 22, whereby the channel means 24 may be adjusted transversely relative to channel means 22 and the adjusting bars 34 and 36 are secured in desired operative position by positioning pins 48. Preferably, the pins 48 have a snug fit within the positioning holes 42 of base 12, whereby the adjusted position of channel means 24 readily is maintained.

After the adjustment of channel means 24 has been accomplished, and determination has been made of whether the deck boards 32 are to be flush at the outer ends thereof with the outer surfaces of runners 28 and 30, or the ends of boards 32 are to overhang the runners a predetermined distance, additional adjustable means on the jig are manipulated to effect the desired positioning of the deck boards 32 relative to the runners. Said positioning means comprises a deck board stop 52. For durability and convenience, the deck board stop 52 may be fabricated from an elongated angle iron member 54. Secured to opposite ends of the member 54 are a pair of right-angle brackets 56. Projecting from the inner vertical faces of member 54 at opposite ends thereof, as well as from the inner faces of the vertical legs of bracket 56 are a pair of sockets 58 which respectively receive one end of a pair of guide rods 60. Said ends of the rods 60 are securely anchored within sockets 58 and sockets 58 are securely fixed to deck board stop 52. Said guide rods also are substantially as long as the head and tail boards 16 and 18 by which they are slidably supported within suitable guide sleeves 62 which, for example, may be carried by supporting plates 64 which are fixedly connected to the head and tail boards 16 and 18 by any suitable means.

The upper guide sleeves 62 have wing bolts 66 threaded thereinto and the heads of the wing bolts readily are accessible for manual operation to clamp the guide rods 60 at any desired position at which it is desired to dispose the angle iron member 54 of the deck board stop 52 relative to the fixed channel means 22.

To facilitate the accurate positioning of the deck board stop 52 relative to channel means 22 as well as base 12, the head and tail boards 16 and 18 are provided in similar locations with suitable scales 68 and indicating pointers 70, respectively carried by one of the guide rods 60 at opposite sides of the jig are movable with the guide rods 60 adjacent the scales 68, whereby accurate positioning of the deck board stop 52 may be achieved, not only to space the same transversely relative to the channel means 22 but also to assure parallelism of the same relative to said channel means.

From the specifications of the skids to be assembled by use of the jig comprising the invention, the space between the runners 28 and 30 will be known. Likewise, the length of the deck boards 32 will be known, whereby the difference between the length of the deck boards and the distance between the outer side surfaces of the runners, when divided in half, will determine the distance that the inner surface of the deck board stop 52 will have to be spaced transversely away from the outer vertical surface of runner 28 or the corresponding surface of the channel means 22. It will be understood that the deck board stop 52 is movable into abutment with the ends of the head and tail boards 16 and 18 for example, whereby the outermost elongated member comprising the channel means 22 is positioned immediately beyond said same ends of the head and tail boards 16 and 18 as is evident from Fig. 5. Thus, when no overhang of the deck boards is to be provided and they are to be flush with the vertical outer surfaces of the runners 28 and 30, the deck board stop 52 will abut the ends of head and tail boards 16 and 18 and the corresponding reading upon scales 68 relative to pointers 70 will be zero. Further, the indicia upon the scales 68 preferably are indicated in inches and increments thereof, whereby direct settings of the pointers 70 relative to desired inch measurements may be made to provide the required spacing of the deck board stop 52 relative to the ends of the head and tail boards 16 and 18 which will correspond to the outer vertical surface of the runner 28 of the skid.

After the assembly jig has been adjusted to dispose the adjustable channel means 24 relative to fixed channel means 22, and the deck board stop 52 has been adjusted to the required spacing from the channel in channel means 22 as well as the ends of the head and tail boards 16 and 18, the runners 28 and 30 quickly are placed within the channel means 22 and 24 and one end of each runner is abutted against the head board 16. The deck boards 32 then are placed quickly upon the upper surfaces or edges of the runners 28 and 30, the first such board being placed in abutment against the inner surface of headboard 16 as shown in Figs. 1 and 7, one end of each of the deck boards also being abutted against the inner surface of angle iron member 54 of the deck board stop 52. When the boards 32 have been placed upon the runner so as to sufficiently cover the same and extend to the outer ends thereof as shown in Fig. 1 in phantom outline, nails or other securing means such as screws are applied through the deck boards into the upper edges of the runners to form a completed skid. This may be done either manually or, in mechanized establishments, by a nailing machine to which the jig 10 and the assembly jig with the skid components assembled thereon has been moved by suitable conveyor means for example.

It will be understood of course that the angle iron member 54 of the deck board stop 52 extends sufficiently high in a vertical direction and also is of a sufficient vertical dimension to be capable of positioning deck boards upon runners of a substantial range of heights, depending upon the general range of sizes of skids to be manufactured by a given establishment. Further, to facilitate the handling of the deck boards 32 relative to the jig, the head and tail boards 16 and 18 respectively are preferably provided with elongated notches 72 which are best shown in Fig. 1.

Also from Fig. 1, it will be seen that the jig preferably is of adequate overall width and length to be capable of permitting the assembly of a substantial range of sizes of skids in which the runners may be spaced apart up to substantially the full length of the base 12, which skids may have runners as long as the width of base 12 between head and tail boards 16 and 18.

From the foregoing, it will be seen that a highly versatile assembly jig is provided upon which skids may be assembled in a wide variety of sizes and the adjustable components of the jig assembly may be regulated and secured in adjusted position by locking means, whereby the repeated assembly of skids of the same size for which the jig has been adjusted may be made. The adjustment of the channel means as well as the deck board stop are accomplished quickly and readily through the use of appropriate scales fixed to the jig relative to movable portions of these adjustable components, whereby the use of auxiliary measuring means is obviated and accurate positioning of the adjustable elements is obtained.

While the invention has been described and illustrated in its several preferred embodiments, and has included certain details, it should be understood that the invention is not to be limited to the precise details herein illustrated and described since the same may be carried out in other ways falling within the scope of the invention as claimed.

We claim:

1. A jig for assembling and positioning deck members across a pair of runners while being secured thereto to form a skid, said jig comprising in combination, a platform-like base, a pair of channel means having unobstructed channel ways supported by said base in parallel relation to each other and spaced transversely apart respectively to receive within the channels the edges of similar runners for a skid and support the runners vertically from the edges thereof when positioned within said channel means, one of said channel means being stationary relative to said base and the other being adjustably supported by said base for movement in a direction transverse to said other channel means to vary the spacing between said runners, a head stop supported by said base fixedly adjacent one edge transverse to said channel means and against which one end of each runner is abuttable in said channel means, and an elongated deck board stop positioned adjacent another edge of said base parallel to said channel means and extending vertically above said base a distance greater than the vertical dimension of the runners when supported within said channel means, whereby deck members of similar length at least equal to the transverse distance between the outer faces of said runners may be positioned upon the upper edges of said runners while being secured thereto and butted at one end against said deck board stop to dispose the opposite ends of said deck boards evenly with each other and said runners, the outermost deck board at one end of said skid being abuttable with said head stop to dispose said deck boards squarely transverse to said runners.

2. A jig for assembling and positioning deck members across a pair of runners while being secured thereto to form a skid, said jig comprising in combination, a base, a pair of channel means supported by said base in parallel relation to each other and spaced transversely apart respectively to receive similar runners for a skid and support the runners vertically from the edges thereof when positioned within said channel means, one of said channel means being stationarily secured to said base adjacent one edge thereof and the other being adjustably supported by said base for movement transverse to said stationary channel means, a head stop supported by said base adjacent one edge transverse to said channel means and against which one end of each runner is abuttable when positioned in said channel means, and an elongated deck board stop adjustably positioned adjacent the edge of said base adjacent which said stationary channel means is secured, said stop being continuously parallel to said edge of said base and movable transversely to said channel means while remaining parallel thereto and said stop also extending vertically above said base a distance greater than said channel means and the vertical dimension of the runners when supported within said channel means, whereby deck members of similar length at least equal to the transverse distance between the outer faces of said runners may be positioned upon the upper edges of said runners while being secured thereto and butted at one end against said deck board stop to dispose the opposite ends of said deck boards evenly with each other and said runners, the outermost deck board at one end of said skid being abuttable with said head stop to dispose said deck boards squarely transverse to said runners.

3. A jig for assembling and positioning deck members across a pair of runners while being secured thereto to form a skid, said jig comprising in combination, a base, a pair of channel means supported by said base in parallel relation to each other and spaced transversely apart respectively to receive similar runners for a skid and support the runners vertically from the edges thereof, a head stop supported by said base adjacent one edge transverse to said channel means and against which one end of each runner is abuttable when positioned in said channel means, a tail stop supported by said base adjacent the edge thereof opposite that by which said head stop is supported and parallel thereto, said head and tail stops extending vertically a distance greater than the vertical dimension of said channel means and the runners to be supported in said channel means, a deck board stop positioned adjacent another edge of said base parallel to said channel means and extending vertically above said base a distance greater than said channel means and the vertical dimension of the runners to be supported within said channel means, whereby deck members of similar length at least equal to the transverse distance between the outer faces of said runners may be positioned upon the upper edges of said runners while being secured thereto and butted at one end against said deck board stop to dispose the opposite ends of said deck boards evenly with each other and said runners, said deck board stop extending between said head and tail stops adjacent their corresponding ends, and means connected to said deck board stop adjacent the ends thereof and respectively adjustably connected to said head and tail stops to render the deck board stop adjustable outward from said ends of said head and tail stops, the outermost deck board at one end of said skid being abuttable with said head stop to dispose said deck boards squarely transverse to said runners.

References Cited in the file of this patent

UNITED STATES PATENTS

| | | |
|---|---|---|
| 319,521 | Smith et al. | June 9, 1885 |
| 849,069 | Hicks | Apr. 2, 1907 |
| 2,305,124 | Wilson et al. | Dec. 15, 1942 |
| 2,662,565 | Le Vay | Dec. 15, 1953 |
| 2,811,186 | Honza | Oct. 29, 1957 |

FOREIGN PATENTS

| | | |
|---|---|---|
| 407,641 | Great Britain | Mar. 22, 1934 |